(12) United States Patent
Takei (10) Patent No.: US 7,508,820 B2
(45) Date of Patent: Mar. 24, 2009

(54) VOIP COMMUNICATION APPARATUS, NUMBER PATTERN CORRESPONDENCE STORING METHOD AND NUMBER JUDGING METHOD

(75) Inventor: Katsuaki Takei, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 667 days.

(21) Appl. No.: 11/086,316

(22) Filed: Mar. 23, 2005

(65) Prior Publication Data
US 2005/0213568 A1 Sep. 29, 2005

(30) Foreign Application Priority Data
Mar. 25, 2004 (JP) ............................. 2004-088336
Mar. 16, 2005 (JP) ............................. 2005-075861

(51) Int. Cl.
*H04L 12/66* (2006.01)
*H04L 12/28* (2006.01)
*H04M 1/56* (2006.01)

(52) U.S. Cl. .................. 370/352; 370/401; 379/142.06
(58) Field of Classification Search ......... 370/352–356, 370/401; 379/142.06
See application file for complete search history.

(56) References Cited
U.S. PATENT DOCUMENTS
5,345,410 A * 9/1994 Yokoyama et al. .......... 708/491

| 6,097,935 | A  | * | 8/2000 | Takahashi et al. | ......... 455/186.1 |
| 6,535,505 | B1 | * | 3/2003 | Hwang et al. | ................ 370/352 |
| 6,741,688 | B1 | * | 5/2004 | Yau | ........................ 379/142.01 |
| 7,239,629 | B1 | * | 7/2007 | Olshansky et al. | .......... 370/353 |
| 7,248,682 | B1 | * | 7/2007 | Oran | ...................... 370/395.52 |

FOREIGN PATENT DOCUMENTS
JP       2003-158553       5/2003

* cited by examiner

*Primary Examiner*—Hong Cho
(74) *Attorney, Agent, or Firm*—Rabin & Berdo, P.C.

(57) ABSTRACT

In a VoIP communication apparatus which receives a call number from one telephone device and judges whether the call number coincides with any of plural telephone numbers managed by a call server, a symbol storing section which stores respective symbol correspondence data formed by writing a distinguishable predetermined bit value into different predetermined bit positions corresponding to respective symbols used for expressing the telephone number; a number scope storing section which stores respective figure correspondence data each formed by writing the predetermined bit value into at least one the same predetermined bit position corresponding to more than one usable symbol on corresponding figure; and a collating and judging section which respectively collates the symbol correspondence data corresponding to the symbols on respective figures in the call number with the figure correspondence data of the same figure and judges whether the call number is contained in these telephone numbers are provided.

25 Claims, 4 Drawing Sheets

VOIP COMMUNICATION APPARATUS, NUMBER PATTERN CORRESPONDENCE STORING METHOD AND NUMBER JUDGING METHOD

BACKGROUND OF THE INVENTION

1. Field of the Invention

The invention relates to a VoIP communication apparatus intervening between telephone device and call server, its number pattern correspondence storing method and its number judging method.

2. Related Background Art

In communication system, a VoIP (Voice over Internet Protocol) communication apparatus intervening between telephone device and call server is used. The VoIP communication apparatus, for example, is connected with a telephone device via telephone wire and is connected with a call server via MGCP (Media Gateway Control Protocol) on Internet. The VoIP communication apparatus may restrain the data transmission amount toward the call server.

That is, the call server previously manages all telephone numbers corresponding telephone subscribers, and has a PBX (private branch exchange) for connecting to a corresponding connection destination on the basis of a dial number output from the telephone device. When the PBX judged that the dial number does not exist in the all telephone numbers, that is, the connection destination does not exist, in order to notify the telephone device which output the dial number of such un-accurate situation, the PBX sends a signal as a data, such as voice to the telephone device. Because of this, between the telephone device and the call server, the transmission amount of round-trip data becomes much.

In order to decrease the transmission amount, it can be considered to provide the VoIP communication apparatus intervening between the telephone device and call server with a judging function to judge the accuracy of the dial number, then, to only send the dial number having accuracy to the call server.

In order to realize the judging function, the VoIP communication apparatus should receive a number pattern from the call server, which expresses a number scope obtained on the basis of each telephone number managed by the call server; then, on the basis of the number pattern, store a corresponding scope data expressing the number scope; further, by referring the scope data, judge whether the dial number received from the telephone device corresponds to the number scope, that is, whether the dial number has accuracy.

With respect to the scope data, in the past, it is obtained by changing the data of the number pattern into binary code. Because of this, in order to store the scope data with binary code, it is necessary to prepare a memory having an enormous storing amount.

However, in the VoIP communication apparatus, because the memory capacity for storing data only is small in general, it is difficult to store such scope data.

SUMMARY OF THE INVENTION

It is, therefore, an object of the invention to provide a VoIP communication apparatus capable of storing scope data obtained on the basis of a number pattern output from a call server only by using smaller storing capacity, and capable of easily judging the accuracy of any call number output from one telephone device; and to provide a number pattern correspondence storing method and a number judging method.

According to the present invention, there is provided a VoIP (Voice over Internet Protocol) communication apparatus which is connected with more than one telephone device, receives a call number from the telephone device, and judges whether the call number coincides with any of a plurality of telephone numbers managed by a call server, comprising:

a symbol storing section in which respective symbol correspondence data corresponding to respective symbols used for expressing the telephone number are stored, and a distinguishable predetermined bit value is written in predetermined bit positions that are different each other with respect to the respective symbol correspondence data;

a number scope storing section in which respective figure correspondence data corresponding to respective figures each being able to use more than one the symbol are stored to correspond to a number scope containing the plurality of telephone numbers, and the predetermined bit value is written in at least one the predetermined bit position corresponding to the more than one symbol with respect to each figure correspondence data; and a collating and judging section which respectively collates the symbol correspondence data that are stored in the symbol storing section and correspond to the symbols on respective figures in the call number with the figure correspondence data of the same figure stored in the number scope storing section, and judges whether the call number is contained in the plurality of telephone numbers.

The VoIP communication apparatus may further comprise a communication section which receives the number pattern expressing the number scope from the call server; and a generating section which generates respective the figure correspondence data on the basis of the number pattern.

In the VoIP communication apparatus, the communication section sends the call number which is judged being coincident by the collating and judging section to the call server.

Moreover, in the VoIP communication apparatus, the symbol correspondence data and the figure correspondence data all have bits whose number is greater than the number of the symbols.

The symbols may be digits 0~9 and marks * and #. In this case, the number of the bits is 16 ($2^4$).

Moreover, in the VoIP communication apparatus, the distinguishable predetermined bit value may be "1". In this case, the collating and judging section performs an AND logical operation as a collating process.

Moreover, in the VoIP communication apparatus, the distinguishable predetermined bit value may be "0". In this case, the collating and judging section performs an OR logical operation as a collating process.

Moreover, the VoIP communication apparatus may further comprise a temporal remembering section to temporarily store the call number and the number pattern.

Moreover, in the VoIP communication apparatus, the number pattern includes respective figure patterns corresponding to respective figures; each the figure pattern expresses to be able to use more than one the symbol and corresponds to the figure correspondence data of the same figure.

Further, according to the present invention, there is provided a number pattern correspondence storing method used for receiving a number pattern which corresponds to a number scope containing a plurality of telephone numbers that are managed by a call server and formed by symbols in appointed figures-number and has respective figure patterns corresponding to respective figures each can use more than one the symbol, and used for storing the number pattern, comprising:

preparing a storing section has a plurality of storing areas to correspond to the respective figures;

making the figure patterns respectively correspond to the storing areas;

making the symbols respectively correspond to the different predetermined bit positions in each the storing area; and writing a distinguishable predetermined bit value into the respective bit positions corresponding to the more than one symbol in corresponding the figure pattern, with respect to each the storing area.

The number pattern correspondence storing method may further comprise a step of setting the storing area to appointed bits-number on the basis of the number of the symbols.

In the number pattern correspondence storing method, the symbols may be digits 0~9 and marks * and #. In this case, the bits-number is 16 ($2^4$).

Furthermore, according to the present invention, there is provided a number judging method used for receiving a call number from one of at least two telephone devices and judging whether the call number coincides with any of a plurality of telephone numbers managed in a call server, comprising:

using a symbol storing section in which respective symbol correspondence data corresponding to respective symbols used for expressing the telephone number are stored, and a distinguishable predetermined bit value is written in predetermined bit positions that are different from each other with respect to the respective symbol correspondence data;

using a number scope storing section in which respective figure correspondence data corresponding to respective figures each being able to use more than one the symbol are stored to correspond to a number scope containing the plurality of telephone numbers, and the predetermined bit value is written in at least one the predetermined bit position corresponding to the more than one symbol with respect to each figure correspondence data; and collating respectively the symbol correspondence data that are stored in the symbol storing section and correspond to the symbols on respective figures in the call number with the figure correspondence data of the same figure stored in the number scope storing section; and judging whether the call number is contained in the plurality of telephone numbers.

The number judging method may further comprise two step of receiving the number pattern expressing the number scope from the call server; and generating respective the figure correspondence data on the basis of the number pattern.

Moreover, the number judging method may further comprise a step of sending the call number which is judged being coincident by the collating and judging section to the call server.

In the number judging method, the symbol correspondence data and the figure correspondence data all have bits whose number is greater than the number of the symbols.

Moreover, in the number judging method, the symbols may be digits 0~9 and marks * and #. In this case, the number of the bits is set to 16 ($2^4$).

Moreover, in the number judging method, the distinguishable predetermined bit value may be "1". In this case, a process for collating is AND logical operation.

Moreover, in the number judging method, the distinguishable predetermined bit value may be "0". In this case, a process for collating is OR logical operation.

Moreover, the number judging method may further comprise a step of temporarily storing the call number and the number pattern.

Moreover, in the number judging method, the number pattern includes respective figure patterns corresponding to respective figures; each the figure pattern expresses to be able to use more than one the symbol and corresponds to the figure correspondence data of the same figure.

In the present invention, according to the VoIP communication apparatus, the number pattern correspondence storing method and the number judging method, because the data of the number scope is obtained by making the different predetermined bit positions correspond to the symbols being able to express the telephone number; by writing the distinguishable predetermined bit value into at least one predetermined positions corresponding to the more than one usable symbols with respect to the respective figure patterns in the number pattern; and by forming respective figure correspondence data, the storing capacity for storing the data of the number scope becomes very little. As a result, it can be simply realized to use a VoIP communication apparatus to reduce the amount of transmission data between the telephone device and the call server.

The above and other objects and features of the present invention will become apparent from the following detailed description and the appended claims with reference to the accompanying drawings.

DETAILED DESCRIPTION OF THE PREFERRED EMBODIMENTS

Embodiment

Embodiment of the invention will now be described hereinbelow with reference to the drawings. In the embodiment, a VoIP communication apparatus, a number pattern correspondence storing method and a number judging method will be explained in detail.

Figure 1:
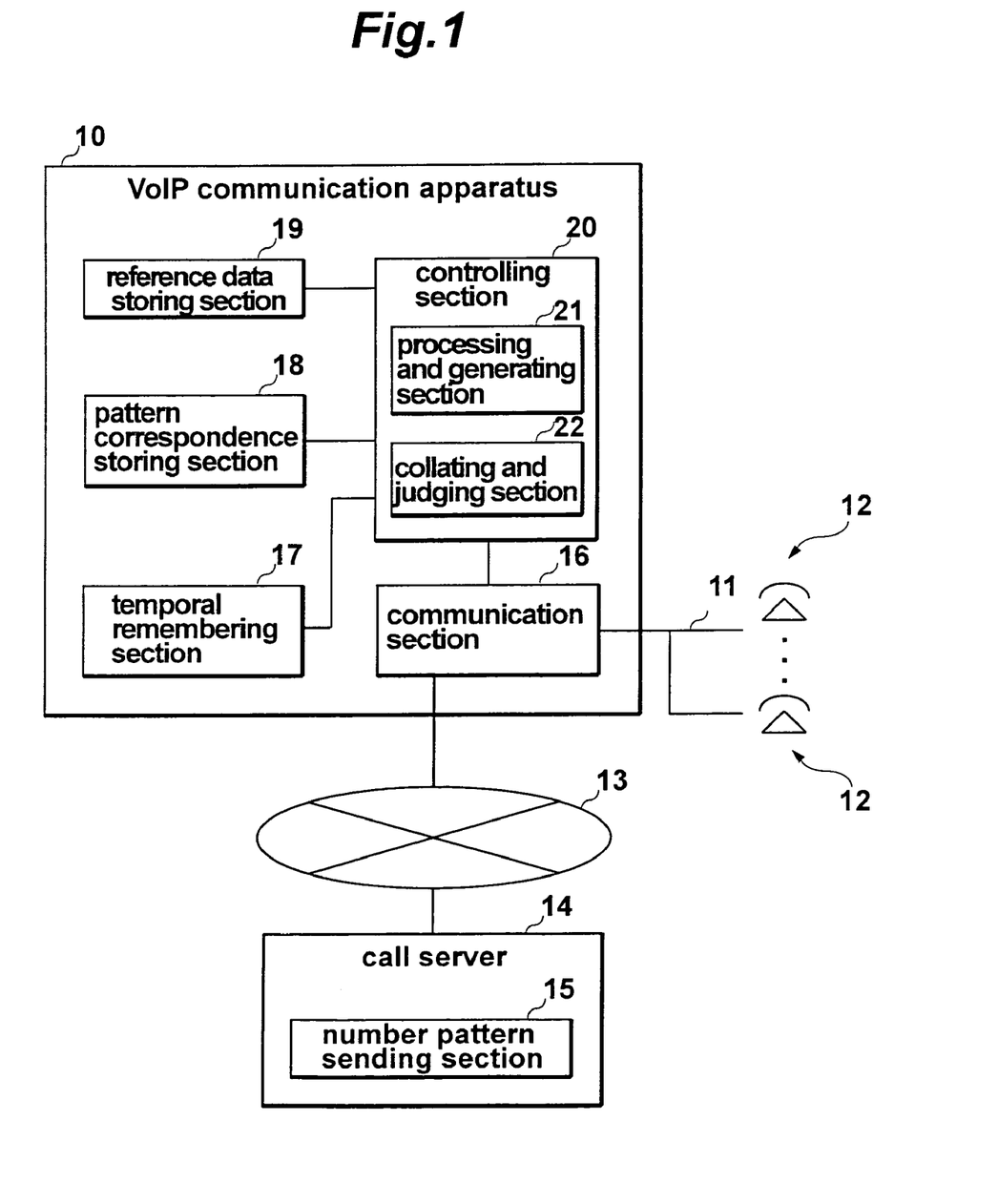
FIG. 1 is a block diagram showing the construction of a VoIP communication apparatus of the present invention.

FIG. 1 is a block diagram showing the construction of a VoIP communication apparatus of the present invention.

The VoIP communication apparatus 10 of the present invention, as shown in FIG. 1, is connected with at least one telephone device 12 via telephone wire 11; further is connected with a call server 14 via IP (Internet Protocol) net 13.

The telephone device 12 sends a dial number to the VoIP communication apparatus 10. The call server 14 previously manages all telephone numbers corresponding to telephone subscribers, and has a number pattern sending section 15 which sends a number pattern indicating number scope obtained from the all telephone numbers to the VoIP communication apparatus 10.

In the embodiment, the telephone number is set into ten-figure number, and is made up of digits from 0 to 9 and marks * and #. Then, the telephone numbers managed in the call server 14 are set to consist of 0312345000, 03123450001, 0312345003, . . . , 0312345498, 0312345499, 031234549* and 031234549#.

Accordingly, the corresponding number scope is 0312345000~0312345499, 031234549* and 031234549#.

Then, if using mark X as a wild card to express the digits 0~9 and marks * and #, to correspond to each figure, the number pattern indicating the number scope of all telephone numbers becomes 0312345[0~4][0~9]X. The number pattern contains respective figure patterns 0, 3, 1, 2, 3, 4, 5, [0~4], [0~9] and X, each figure pattern indicates more than one usable symbol (i.e. digit or mark) on corresponding figure.

The number pattern is sent by the number pattern sending section 15 from the telephone device 14 to the VoIP communication apparatus 10.

The VoIP communication apparatus 10 of the present invention, as shown in FIG. 1, further comprises a communication section 16, a temporal remembering section 17, a pattern correspondence storing section 18, a reference data storing section 19 and a controlling section 20 to control these sections.

The reference data storing section 19, as a symbol storing section, is used for storing symbol correspondence data that respectively correspond to the digits 0~9 and marks * and #.

Figure 2:
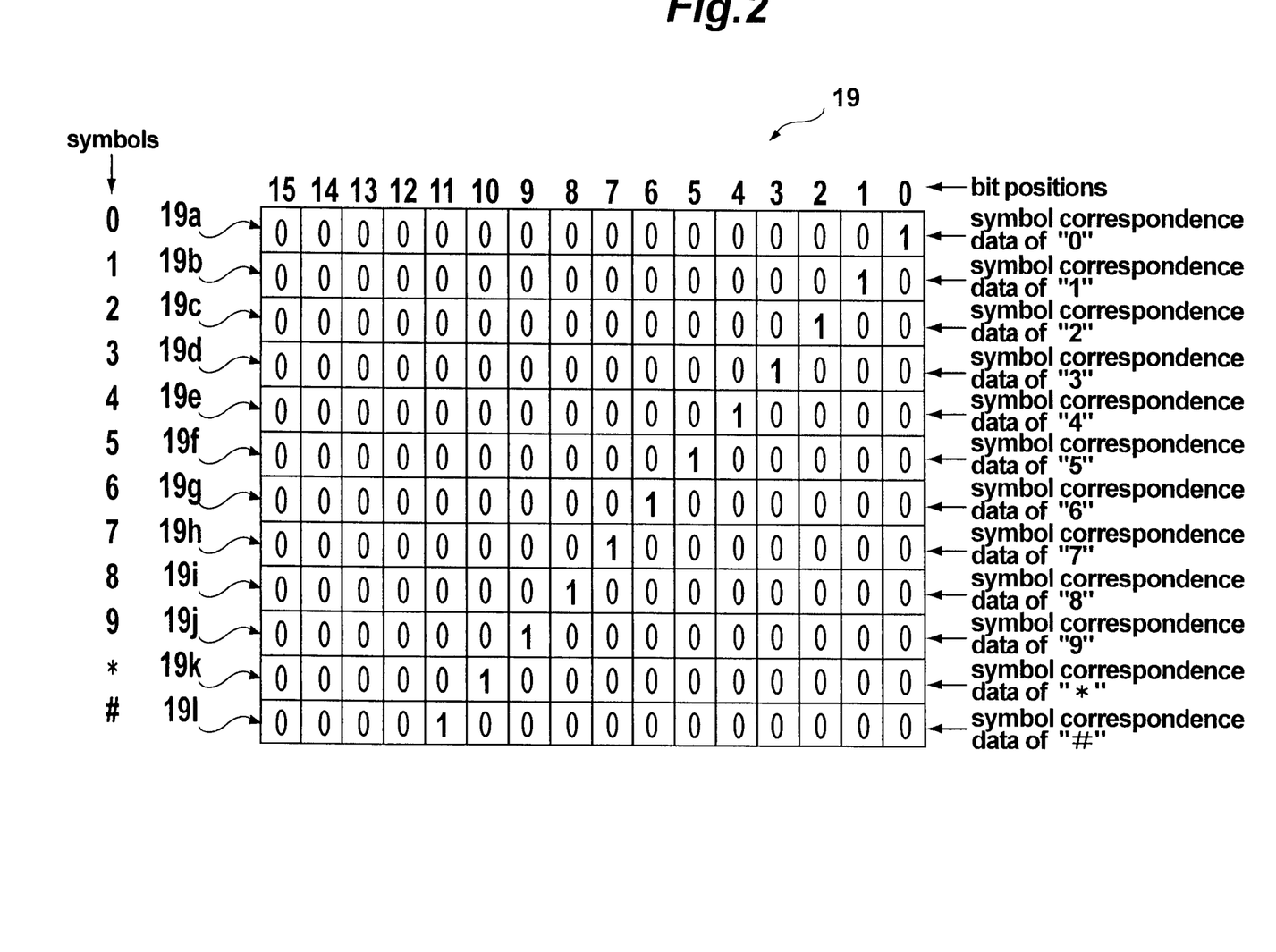
FIG. 2 is an explanatory diagram showing the construction of a reference data storing section of the present invention.

FIG. 2 is an explanatory diagram showing the construction of a reference data storing section of the present invention.

The reference data storing section 19, as shown by FIG. 2, to correspond to the digits 0-9 and marks * and #, contains respective symbol storing areas 19a, 19b, ..., 19k and 19l. In order to store the symbol correspondence data, each symbol storing area is formed from 16 bits. In such structure, bit positions are set from lowest rank bit position 0 to highest rank bit position 15. On the bit positions that are different from each other and respectively correspond to the above-stated digits and marks, bit value "1" is filled in.

That is, with respect to the symbol storing area 19a, on the bit position 0 to correspond to the digit "0", bit value "1" is written in; on the other bit positions 1~15, bit value "0" is written in. Thereby, the correspondence data of digit "0", as a symbol correspondence data, becomes "0000000000000001". The symbol correspondence data "0000000000000001" means digit "0".

Then, in the same way as this, in the other symbol storing areas 19b~19l, to correspond to the other digits 0~9 and marks * and symbol correspondence data "0000000000000001", "0000000000000010", ..., "0000100000000000" are respectively stored.

In the embodiment, to sequentially correspond to the digits 0~9 and the marks * and #, the bit position 0 of the symbol storing area 19a corresponding to the digit "0", the bit position 1 of the symbol storing area 19b corresponding to the digit "1", ..., the bit position 11 of the symbol storing area 19l corresponding to the mark "#" are used as different predetermined bit positions. Further, because the bit value "1" of these predetermined bit positions is different from the other bit value "0", it is used as a distinguishable predetermined bit value.

Moreover, it is possible to change the order of the predetermined bit positions corresponding to the digits 0~9 and the marks * and #. And it is possible to change the distinguishable predetermined bit value from "1" to "0", in this case, the other bit value "0" should be set from "0" to "1".

Further, in the VoIP communication apparatus 10, the above-stated communication section 16 has a function to receive the number pattern "0312345[0~4][0~9]X" output from the call server 14 and the dial number output from the telephone device 12.

The above-stated temporal remembering section 17 has a function to temporarily store the number pattern and the dial number.

Then, the above-stated pattern correspondence storing section 18, as a number scope storing section, is used to store number scope data corresponding to the number pattern.

The above-stated controlling section 20 has a processing and generating section 21 and a collating and judging section 22. The processing and generating section 21 executes a writing process on the basis of the number pattern, generates the number scope data and makes the pattern correspondence storing section 18 to store the number scope data. The collating and judging section 22 performs a collating process to collate the dial number with the number scope data and judges the accuracy of the dial number.

Figure 3:
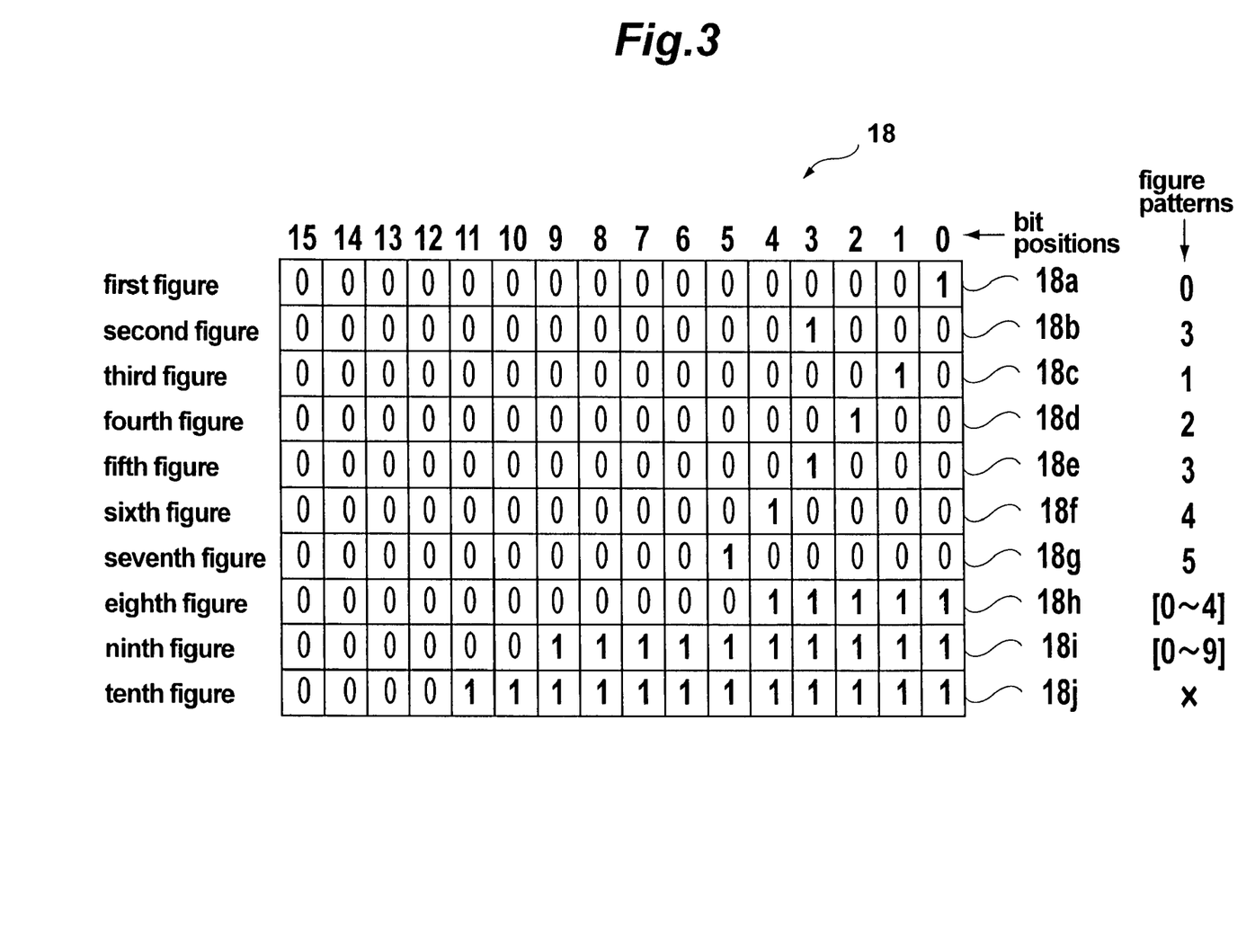
FIG. 3 is an explanatory diagram showing the construction of a pattern correspondence storing section of the present invention.

FIG. 3 is an explanatory diagram showing the construction of a pattern correspondence storing section of the present invention.

As shown in FIG. 3, to correspond to the figure patterns "0", "3", "1", "2", "3", "4", "5", "[0~4]", "[0~9]" and "X" of the "0312345[0~4][0~9]X", the pattern correspondence storing section 18 includes figure correspondence areas 18m (m=a, b, c, ..., j) as storing areas.

The figure correspondence areas 18m are respectively correspond to the figure patterns "0", "3", "1", "2", "3", "4", "5", "[0~4]", "[0~9]" and "X", and are respectively formed from 16 bits in the same way as the symbol storing area of the reference data storing section 19 in order to store figure correspondence data. Then, bit positions are similarly set from bit position 0 to bit position 15.

In each figure correspondence data 18m, in the same way as the reference data storing section 19, to sequentially correspond to the digits 0~9 and marks * and #, the bit positions 0~11 are set as predetermined bit positions that are different from each other. Then, on the basis of the corresponding figure pattern, the distinguishable bit value "1" is written in at least one predetermined bit position which corresponds to more than one usable symbol.

That is, with respect to first figure, the figure pattern is "0", it means that only digit "0" can be used in the first figure of telephone number, therefore on the bit position 0 corresponding to the digit "0", the bit value "1" is written in; and on the other bit positions, bit value "0" are written in.

Consequently, the data indicating symbol scope in the first figure, as figure correspondence data, becomes "0000000000000001".

In the same way as this, with respect to second figure, the figure pattern is "3", it means that only digit "3" can be used in the second figure of telephone number, therefore only on the bit position 3 corresponding to the digit "3", the bit value "1" is written in. Thereby, the figure correspondence data in the second figure becomes "0000000000001000".

Then, with respect to third figure to seventh figure, because the figure patterns respectively are "1", "2", "3", "4" and "5", the figure correspondence data respectively are "0000000000000010", "0000000000000100", "0000000000001000", "0000000000010000" and "0000000000100000".

Further, with respect to eighth figure, the figure pattern is "[0~4]", it means that digits "0", "1", "2", "3" and "4" can be used in the eighth figure of telephone number. Therefore, on the bit position 0 corresponding to the digit "0", the bit position 1 corresponding to the digit "1", the bit position 2 corresponding to the digit "2", the bit position 3 corresponding to the digit "3" and the bit position 4 corresponding to the digit "4", the bit value "1" is respectively written in. Thereby, the figure correspondence data in the eighth figure is "0000000000011111" (refer to 18h).

Also, with respect to ninth figure, the figure pattern is "[0~9]", it means that digits "0"~"9" can be used in the ninth figure of telephone number. Therefore, on the bit positions 0~9, the bit value "1" is respectively written in, the figure correspondence data in the ninth figure is "0000001111111111" (refer to 18i).

Then, with respect to tenth figure, the figure pattern is "X", it means that all symbols (digits 0~9 and marks * and #) can be used in the tenth figure of telephone number. Therefore, on the all predetermined bit positions from bit position 0 to bit position 9, the bit value "1" is respectively written in, the figure correspondence data in the ninth figure is "0000111111111111" (refer to 18j).

Thus, with respect to the number pattern "0312345[0~4][0~9]X", in the past, because storing the binary code of 0312345000~0312345499, 031234549* and 031234549#, it makes to need very enormous storing capacity. However, in the present invention, because using the number pattern correspondence storing method to storing such figure correspondence data as stated above, it is possible to attain the same goal by very little storing capacity.

Moreover, when the number of figures is identical, even if the number pattern output from the call server 14 is changed, the storing capacity of the pattern correspondence storing section 18 is the same.

Figure 4:
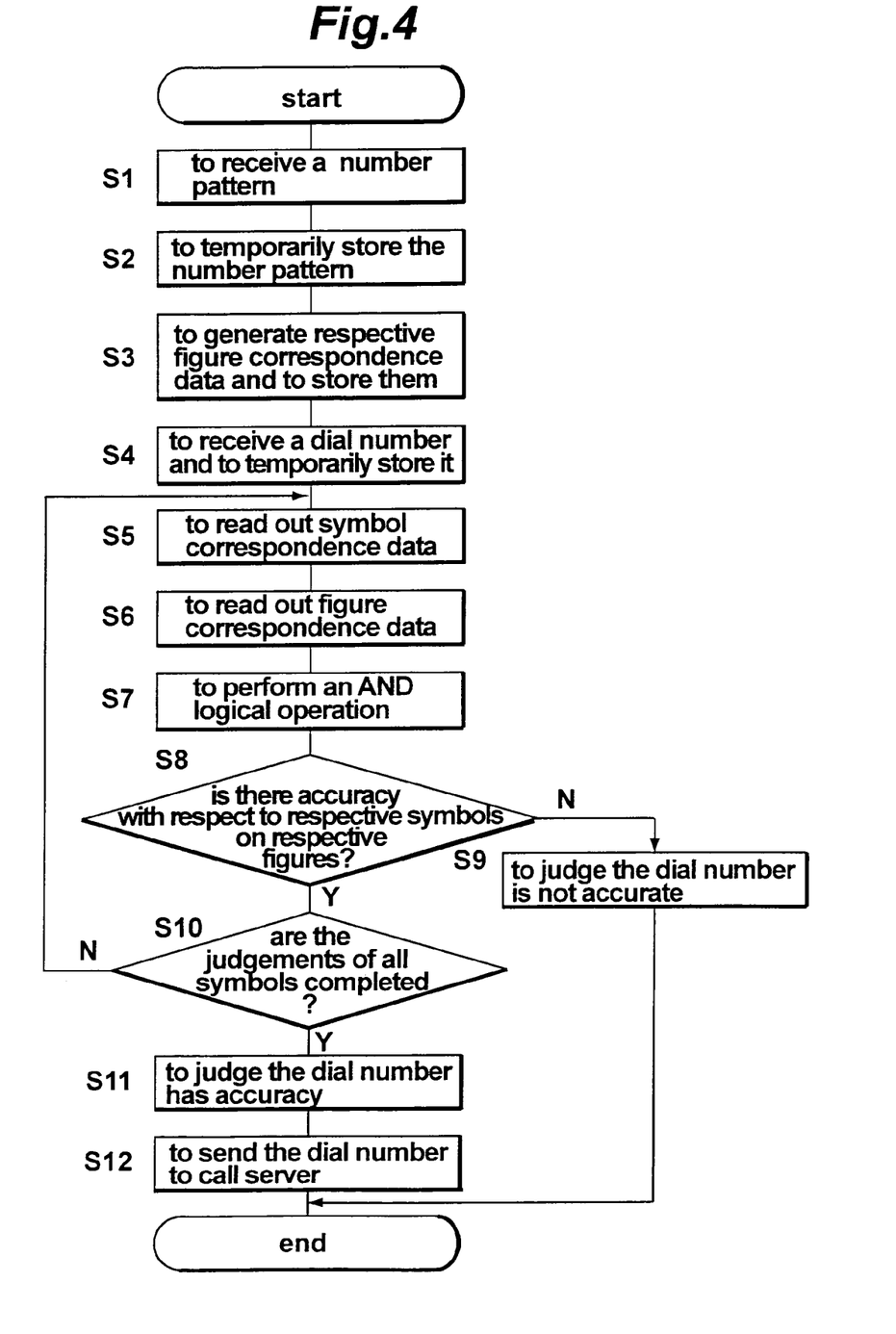
FIG. 4 is a flowchart for explaining the operations of a VoIP communication apparatus of the present invention.

Next, to explain the operations of the VoIP communication apparatus 10 of the present invention by using a flowchart.

FIG. 4 is a flowchart for explaining the operations of a VoIP communication apparatus of the present invention.

In the VoIP communication apparatus 10, first of all, the communication section 16 receives the above-stated number pattern "0312345[0~4][0~9]X" from the call server 14 (step 1).

Then, the controlling section 20, after received the number pattern, makes the temporal remembering section 17 remember the number pattern (step 2).

The processing and generating section 21 analyzes the number pattern; then on the basis of the figure patterns "0", "3", "1", "2", "3", "4", "5", "[0~4]", "[0~9]" and "X" contained in the number pattern, performs the above-stated respective writing processes with respect to figure correspondence areas 18m of the pattern correspondence storing section 18 (step 3).

By the writing processes, the respective figure correspondence data (refer to FIG. 3) are generated as stated above, and are stored in the pattern correspondence storing section 18 (step 3).

After that, when the communication section 16 received a dial number, for example, 0312345258 from the telephone device 12, the controlling section 20 makes the temporal remembering section 17 remember the dial number (step 4).

Then, the collating and judging section 22 analyzes the dial number; and on the basis of the symbols on each figure, reads out the corresponding symbol correspondence data from the reference data storing section 19 (step 5). Because the first figure of the dial number is "0", the corresponding symbol correspondence data is read out from the figure correspondence area 19a of the reference data storing section 19.

Further, the collating and judging section 22 reads out the figure correspondence data to correspond to first figure from the figure correspondence area 18a of the pattern correspondence storing section 18 (step 6).

Continuously, the collating and judging section 22 performs a AND logical operation as collating process with respect to each corresponding bit values in the symbol correspondence data (refer to 19a) read out from the reference data storing section 19 and in the figure correspondence data (refer to 18a) read out from the pattern correspondence storing section 18 (step 7).

Then, the collating and judging section 22 judges whether the symbol (digit "0") on the first figure of the dial number is accurate on the basis of the output data i.e. operation result of the logical operation (step 8).

When the output data has "1", because the symbol on the first figure of the dial number is applicable to the prescribed symbol scope, the collating and judging section 22 judges it is accurate (step 8).

On the contrary, if the output data has not "1", the collating and judging section 22 judges the symbol is not accurate (step 8). At that time, the collating and judging section 22 further judges the dial number is not accurate (step 9).

Next, to explain the above stated steps 5~8 in detail.

That is, with respect to first figure, because the symbol on the first figure of the received dial number 0312345258 is digit "0", the collating and judging section 22 reads out the symbol correspondence data "0000000000000001" corresponding to the digit "0" from the reference data storing section 19, then also reads out the figure correspondence data "0000000000000001" corresponding to the figure pattern of the first figure from the pattern correspondence storing section 18.

Further, the collating and judging section 22 performs AND logical operation with respect to the respective corresponding bit values in the two data. That is, Symbol correspondence data: "0000000000000001"
AND
Figure correspondence data: "0000000000000001"

In the two data, because the two bit values in the bit position 0 all are "1", the output data of the logical operation, as a operation result, becomes "1". In this case, the collating and judging section 22 judges the symbol "0" on the first figure of the dial number has accuracy.

In the same way, in the embodiment, the collating and judging section 22 judges the symbols "3", "1", "2", "3", "4" and "5" on the second figure to the seventh figure all are accurate.

Further, with respect to eighth figure, because the symbol on the eighth figure of the received dial number 0312345258 is digit "2", the collating and judging section 22 reads out the symbol correspondence data "0000000000000100" corresponding to the digit "2" from the reference data storing section 19, then also reads out the figure correspondence data "0000000000011111" corresponding to the figure pattern "[0~4]" of the eighth figure from the pattern correspondence storing section 18.

Then, the collating and judging section 22 performs the same AND logical operation with respect to the respective corresponding bit values in the two data. That is, Symbol correspondence data: "0000000000000100"
AND
Figure correspondence data: "0000000000011111"

In the two data, because the two bit values in the bit position 2 all are "1", the output data of the logical operation, as a operation result, becomes "1". Thus, the collating and judging section 22 judges the symbol "2" on the eighth figure of the dial number also has accuracy.

In the same way, the symbols "5" and "8" on the ninth figure and the tenth figure also are accurate.

Furthermore, the collating and judging section 22, after judged the accuracy with respect to one symbol on one figure, further judges whether all judgements of the accuracy with respect to the all symbols on every figures in the dial number have been completed (step 10).

If it is not, the collating and judging section 22 executes the step 5 with respect to the symbol on the next figure.

If it is, the collating and judging section 22 judges the dial number 0312345258 has accuracy (step 11). Then, the controlling section 20 makes the communication section 16 send the accurate dial number 0312345258 to the call server (step 12).

Moreover, in the embodiment, when the dial number is judged that it is not accurate, in order to notify the telephone device 12 of the un-accurate situation, the controlling section 20 makes the communication section 16 send a notification signal such as voice to the telephone device 12.

Furthermore, in the embodiment, as the distinguishable predetermined bit value, "1" is used; and as the collating process, AND logical operation is used. However, to replace that, it is possible to set "0" as the distinguishable predetermined bit value, and to set OR logical operation as the collating process. In this case, when the output data of the OR logical operation has "0", the corresponding symbol in dial number will be judged having accuracy.

According to the embodiment, by only using a little storing capacity, it is possible to store scope data consisting of the respective figure correspondence data obtained on the basis of the number pattern output from the call server 14.

Further, even if the number pattern output from the call server 14 is changed, if the number of the figures is fixed, the storing capacity of the pattern correspondence storing section 18 do not change.

Therefore, with respect to the VoIP communication apparatus only having a little storing capacity, it is possible to simply realize to judge the accuracy of the dial number output from telephone device.

Moreover, though the number pattern correspondence storing method and the number judging method of the present invention are used in the VoIP communication apparatus, they also can be applied to other fields.

The present invention is not limited to the foregoing embodiments but many modifications and variations are possible within the spirit and scope of the appended claims of the invention.

What is claimed is:

1. A VoIP (Voice over Internet Protocol) communication apparatus which is connected with more than one telephone device, receives a call number from the telephone device, and judges whether the call number coincides with any of a plurality of telephone numbers managed by a call server, comprising:
    a symbol storing section in which respective symbol correspondence data corresponding to respective symbols used for expressing said telephone number are stored as bit strings, and a distinguishable predetermined bit value is written in predetermined bit positions that are different positions in each said bit string from other said bit strings with respect to said respective symbol correspondence data;
    a number scope storing section in which respective figure correspondence data corresponding to respective figures each being able to use more than one said symbol are stored to correspond to a number scope containing said plurality of telephone numbers, and said predetermined bit value is written in at least one said predetermined bit position corresponding to the more than one symbol with respect to each figure correspondence data; and
    a collating and judging section which respectively collates said symbol correspondence data that are stored in said symbol storing section and correspond to said symbols on respective figures in said call number with said figure correspondence data of the same figure stored in said number scope storing section, and judges whether said call number is contained in said plurality of telephone numbers.

2. The VoIP communication apparatus according to claim 1, further comprising:
    a communication section which receives said number pattern expressing said number scope from said call server; and
    a generating section which generates respective said figure correspondence data on the basis of said number pattern.

3. The VoIP communication apparatus according to claim 2, wherein said communication section sends said call number which is judged being coincident by said collating and judging section to said call server.

4. The VoIP communication apparatus according to claim 1, wherein said symbol correspondence data has bits whose number is greater than the number of said symbols.

5. The VoIP communication apparatus according to claim 4, wherein said symbols are digits 0~9 and marks * and #, the number of said bits is 16 ($2^4$).

6. The VoIP communication apparatus according to claim 1, wherein said figure correspondence data has bits whose number is greater than the number of said symbols.

7. The VoIP communication apparatus according to claim 6, wherein said symbols are digits 0~9 and marks * and #, the number of said bits is 16 ($2^4$).

8. The VoIP communication apparatus according to claim 1, wherein said distinguishable predetermined bit value is "1", said collating and judging section performs an AND logical operation as a collating process.

9. The VoIP communication apparatus according to claim 1, wherein said distinguishable predetermined bit value is "0", said collating and judging section performs an OR logical operation as a collating process.

10. The VoIP communication apparatus according to claim 1, further comprising:
    a temporal remembering section to temporarily store said call number and said number pattern.

11. The VoIP communication apparatus according to claim 1, wherein said number pattern includes respective figure patterns corresponding to respective figures; each said figure pattern expresses to be able to use more than one said symbol and corresponds to said figure correspondence data of the same figure.

12. A number pattern correspondence storing method for receiving and storing a number pattern which corresponds to a number scope containing a plurality of telephone numbers that are managed by a call server and is formed by symbols in respective figure patterns corresponding to respective figures, wherein each of said figure patterns can use more than one said symbol, and is used for storing said number pattern, the method comprising:
    preparing a storing section having a plurality of storing areas to correspond to the respective figures;
    making said figure patterns respectively correspond to said storing areas;
    making said symbols respectively correspond to different predetermined bit positions in each said storing area; and
    writing with respect to each said storing area a distinguishable predetermined bit value into respective ones of said predetermined bit positions corresponding to said more than one symbol in a respectively corresponded said figure pattern.

13. The number pattern correspondence storing method according to claim 12, further comprising:

setting said storing area to appointed bits-number on the basis of the number of said symbols.

14. The number pattern correspondence storing method according to claim 12, wherein said symbols are digits 0~9 and marks * and #, said bits-number is 16 ($2^4$).

15. A number judging method used for receiving a call number from one of at least two telephone devices and judging whether the call number coincides with any of a plurality of telephone numbers managed in a call server, comprising:

storing as bit strings in a symbol storing section respective symbol correspondence data corresponding to respective symbols used for expressing said plurality of telephone numbers, wherein a distinguishable predetermined bit value is written in predetermined bit positions that are different each from the other with respect to said respective symbol correspondence data;

storing as bit strings in a number scope storing section respective figure correspondence data corresponding to respective figures each being able to use more than one of said symbols so as to correspond to a number scope containing said plurality of telephone numbers, wherein said predetermined bit value is written in at least one of said predetermined bit positions corresponding to the more than one of said symbols with respect to each figure correspondence data;

collating respectively said symbol correspondence data that are stored, in said symbol storing section and correspond to said symbols on respective figures in said call number with said figure correspondence data of the same figure stored in said number scope storing section; and judging whether said call number is contained in said plurality of telephone numbers.

16. The number judging method according to claim 15, further comprising:

receiving said number pattern expressing said number scope from said call server; and generating respective said figure correspondence data on the basis of said number pattern.

17. The number judging method according to claim 15, further comprising:

sending said call number which is judged being coincident by said collating and judging section to said call server.

18. The number judging method according to claim 15, wherein said symbol correspondence data has bits whose number is greater than the number of said symbols.

19. The number judging method according to claim 18, wherein said symbols are digits 0-9 and marks * and #, the number of said bits is 16 ($2^4$).

20. The number judging method according to claim 15, wherein said figure correspondence data has bits whose number is greater than the number of said symbols.

21. The number judging method according to claim 20, wherein said symbols are digits 0-9 and marks * and #, the number of said bits is 16 ($2^4$).

22. The number judging method according to claim 15, wherein said distinguishable predetermined bit value is "1", a process for collating is AND logical operation.

23. The number judging method according to claim 15, wherein said distinguishable predetermined bit value is "0", a process for collating is OR logical operation.

24. The number judging method according to claim 15, further comprising:

temporarily storing said call number and said number pattern.

25. The number judging method according to claim 15, wherein said number pattern includes respective figure patterns corresponding to respective figures; each said figure pattern expresses to be able to use more than one said symbol and corresponds to said figure correspondence data of the same figure.

* * * * *